Sept. 29, 1970  G. B. KARNOFSKY ET AL  3,531,259
APPARATUS FOR ROTARY CONTINUOUS COUNTERCURRENT EXTRACTION
Filed Feb. 15, 1967  5 Sheets-Sheet 1

Fig. 1.

INVENTOR
GEORGE B. KARNOFSKY
ARTHUR F. SAXON
AND ROBERT D. GOOD
BY *Marcus W. Dodd*
ATTORNEY

INVENTOR
GEORGE B. KARNOFSKY
ARTHUR F. SAXON
AND ROBERT D. GOOD
BY
ATTORNEY

United States Patent Office 3,531,259
Patented Sept. 29, 1970

3,531,259
APPARATUS FOR ROTARY CONTINUOUS COUNTERCURRENT EXTRACTION
George B. Karnofsky, Arthur F. Saxon, and Robert D. Good, Pittsburgh, Pa., assignors to Blaw-Knox Company, Pittsburgh, Pa., a corporation of Delaware
Filed Feb. 15, 1967, Ser. No. 616,372
Int. Cl. B01d *11/02*
U.S. Cl. 23—269                                             10 Claims

ABSTRACT OF THE DISCLOSURE

This invention relates to a continuous system for contacting solid particulate material with a liquid. More particularly, this invention pertains to apparatus and processes by which a generally counter-gravitational or upflow of liquid is directed through a solids mass to effect thorough submergence thereof and to provide contact of the liquid with all surfaces of the particles of the mass, to free residual extract so that soluble components of such solids may be carried away in solution. A major feature of this invention is the additional concept of providing a continuous countercurrent flow of liquid which upwardly floods the solids material in successive stages to provide a continuous countercurrent contacting system.

---

The apparatus and system of the present invention comprises generally a rotor having a vertical axis and radially positioned receptacles or cells. Actuation of the rotor will move the cells through a substantially horizontal closed path. Situated at spaced intervals circumferentially around the cells' path of rotation are treatment stations or stages. One of the stages is a solids material input or feed stage provided with an input conveying means mounted on a level above the horizontal plane through which the cells rotate so that cells can be successively charged with solids material by means of a stationary input conveyor. At the feed stage solvent is also introduced into each successive cell in order to dissolved extract from the material therein. During the time interval that a specific cell is in position at the feed stage, solvent may be continuously recirculated through the cell in a counter-gravitational or upward direction. As the cells are advanced in stage-to-stage rotation, intrastage upflow recirculation of contacting liquid or solvent may be instigated at each stage and continued there for a predetermined interval of time. At the last stage in the system, following completion of the circulator upflow of liquid through the solids material at that stage, the solids material is discharged successively from advancing cells to a conveyor means which transports it away from the system.

BACKGROUND OF THE INVENTION

Field of the invention

The system of this invention may be found generally desirable for various and diverse applications which have in common the need to contact a mass of solid particles with a liquid in a continuous operation on a substantially large scale for such purposes as extracting a constituent portion of the particle composition with a liquid solvent, washing the particles, or otherwise treating them with a liquid. For illustration, the invention will be described herein with particular reference to its application as a continuous solvent extractor, but such description is for definiteness only and is not meant to be interpreted in any sense as a limitation on the invention.

Description of the prior art

In a familiar type of extraction operation, compartments or cells containing organic solids are continuously or intermittently flooded with a flow of commercial solvent to dissolve a constituent part of the solids. The cells are caused to move about a vertical axis in a closed horizontal circular path and the solvent is caused to circulate by percolation down through successive cells and is drained away from the bottoms of the cells for recirculation or withdrawal from the system. One form of such apparatus is disclosed in the U.S. Pat. No. 2,840,459 of G. B. Karnofsky entitled "Continuous Solvent Extractor and Solvent Extraction System."

Conventional horizontally rotating extractors have certain inherent limitations which can be pointed out with direct reference to the apparatus of Karnofsky. Karnofsky provides that material from which oil is to be extracted should be downwardly discharged from a stationary overhead conveyor and into cells moved successively past the conveyor's discharge chute. Each cell of the apparatus is provided with a perforated bottom door on which the material rests and piles up within the cell. During the various stages of the operation of the system, solvent is pumped from a point below the level of the cell and is applied to the solids contained in the cell by means of an overhead nozzle which directs the liquid flow into the open top of the cell so that it percolates down through the material and out through the perforated floor plate. Application of the Karnofsky device is obviously limited to materials which form a bed through which solvent can percolate by gravity drainage. The present invention employing upflow through the beds of particles, has wider application since a bed resistant to percolation tends to be opened up, and its resistance reduced, by the upflowing liquid. At the opposite extreme, beds which have very high percolation rates require excessive solvent pumping to flood the beds as suggested by Karnofsky; or if the beds are not flooded, the contacting is incomplete. In upflow, the liquid may flow through the bed at any desired and predetermined rate with complete contacting.

Utilization of an upflow of liquid through a bed of material is not in itself new with the present invention. Coal classifying apparatus such as presented by F. E. Smith in his U.S. Pat. No. 2,176,107 entitled "Separation of Materials" utilizes a hydraulic upward-current to bodily displace layers and to separate coal particles. Flotation of ores using air-induced upflow through liquid-immersed minerals is disclosed in Pennington U.S. Pat. No. 1,294,531 to remove an overflow fraction by froth flotation from ore treating compartments. The problems involved in prior art typically represented by the Smith and Pennington patents, however, relate to classification of minerals rather than solvent extraction or washing of soluble substances to which the present invention is concerned.

SUMMARY OF THE INVENTION

Our invention relates to improved process and apparatus for solvent extraction of, or washing of soluble impurities from, particulate solids by means of an upflowing liquid applied in successive concentrations of extracted solute in countercurrent order to successive masses of particulate solids being extracted or washed.

Briefly described, the process of this invention includes subjecting solids material to a series of treatment steps in which the material is contacted by an upflow of recirculated liquid or extraction agent in the form of a solvent solution and wherein the solution recirculated in each succeeding treatment step preferably consists of a lesser quantity of extract and a proportionately greater quantity of solvent as compared to solution utilized for recirculation in a preceding step.

The apparatus of this invention may be summarized as a combination of a series of receptacles for solid particles undergoing extraction or washing and a series of tanks for liquid used in such extraction or washing, arranged for relative circuitous displacement of one series with respect to the other series and interconnected by means of piping, ducts, pumps and manifolds to provide upflow of treating liquid through successive receptacles from successive tanks as they come into operative registry in their relative circuitous movement and to provide transfer of liquid of increasing solute content from successive receptacles to successive tanks in a direction maintaining generally countercurrent washing or extraction of feed particles and particles of less solute content by liquid of decreasing solute strength, concluded by washing with fresh, solute free liquid. The combination includes means for filling successive receptacles with solid particles to be treated at a filling station, means for emptying the receptacles at a discharge station, and means for supplying fresh treating liquid solvent to the system. Preferably, the tanks are stationary and mounted in a circle while the receptacles are assembled to rotate with respect to the tanks about a vertical axis. The tanks may be above the receptacles permitting gravity flow from the tanks to the receptacles, pumps being used to fill successive tanks with overflow from successive receptacles; or the tanks may be below the receptacles permitting gravity flow of overflow from receptacles into the tanks and the pumps being used to transfer the liquid from successive tanks to successive receptacles.

BRIEF DESCRIPTION OF THE DRAWINGS

Our invention is illustrated by the annexed drawings which are briefly described as follows.

DESCRIPTION OF PREFERRED EMBODIMENTS

The system of our invention preferably includes a series of receptacles for particulate solids to be extracted or washed and a series of tanks for supplying to, and collecting from, the receptacles treating liquid in successive treating stages at a flow rate selectable over a substantial range. The maximum rated upflow of liquid in the receptacles is that which conveys the solid particles upwardly; the minimum is the rate at which fresh liquid is supplied the solvent-to-solids ratio selected for the particular extraction or washing operation in question, and the next liquid flow from stage to stage. When this minimum is used, throughout the system, there is no interstage recirculation of liquid but the flow rate is generally increased above this minimum by interstage recirculation. In some cases it may be desirable to employ a liquid flow rate approaching the maximum sufficient to fluidize the bed of solid particles undergoing treatment in the receptacles.

Thus, the system includes at a first stage, an input conveyor means to charge solids materials into successive receptacles or cells, and at another or last stage, output conveyor means so that successive cells can be emptied of solid material and then be moved again through the rotation cycle of the system beginning at the feed stage with intermediate treatment stages spaced between the first and last stages. The system also includes means to introduce a solvent to the system, preferably prior to or at the discharge stage, and means to circulate such solvent from stage-to-stage in a direction counter to the direction of movement of the rotor and cells mounted thereon. The means of stagewise or interstage circulation of solution comprises pairs of stage liquid tanks and pumps, one pair located near each stage position. The tanks may be interconnected in a series by conduits to establish a gravity series flow from tank to tank. Each sump tank also serves as a storage compartment at its respective stage location from which the solution is pumped upwardly into the cells for the recirculation of solution as previously described. Each stage pump pumps liquid into an open-topped radial divided trough which rotates with the cells. Liquid flows from the trough to the cells by gravity through rotating connecting pipes. Liquid overflowing from each rotating cell falls into an open-topped radially divided stationary trough, from which it flows into a sump tank.

The solid particles are thus contacted by an upflow of circulated liquid (solvent and solution of varying extract concentration) at a selectable rate independent of the rate of downward percolation of liquid characteristic of typical percolation extractors.

Figure 1:
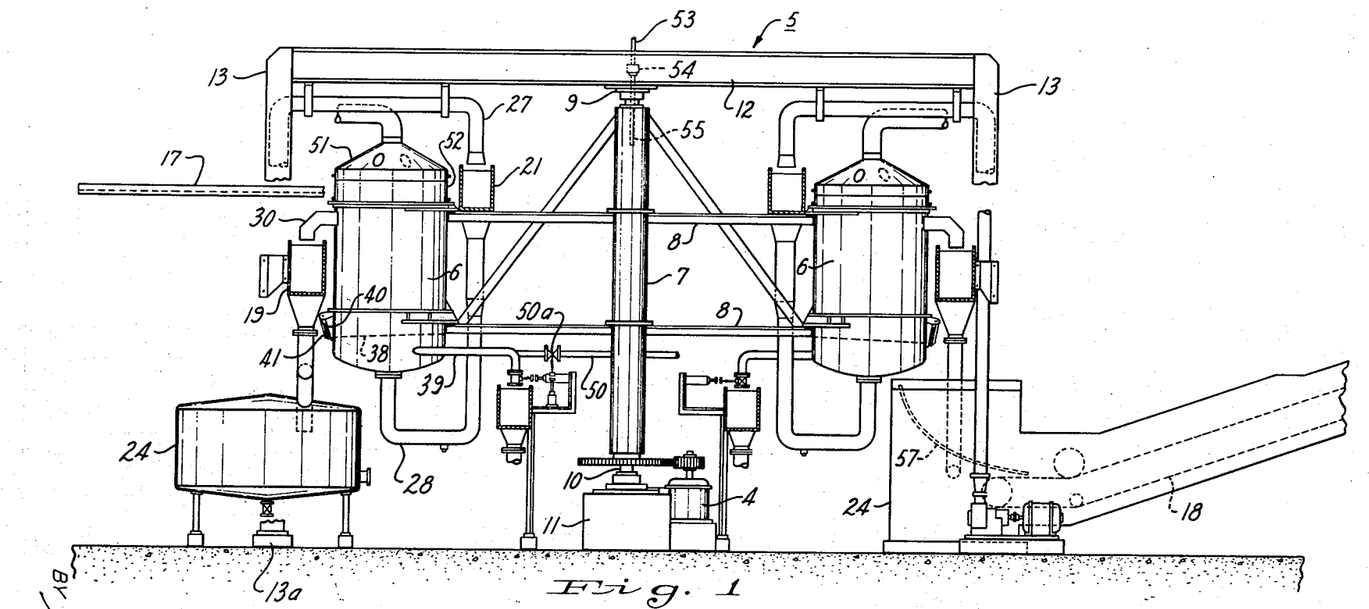
FIG. 1 is a cross-sectional view in elevation taken substantially through the center of the apparatus showing portions of the superstructure thereof and two of the cells making up the extractor apparatus which constitutes a preferred embodiment of this invention.
Figure 2:
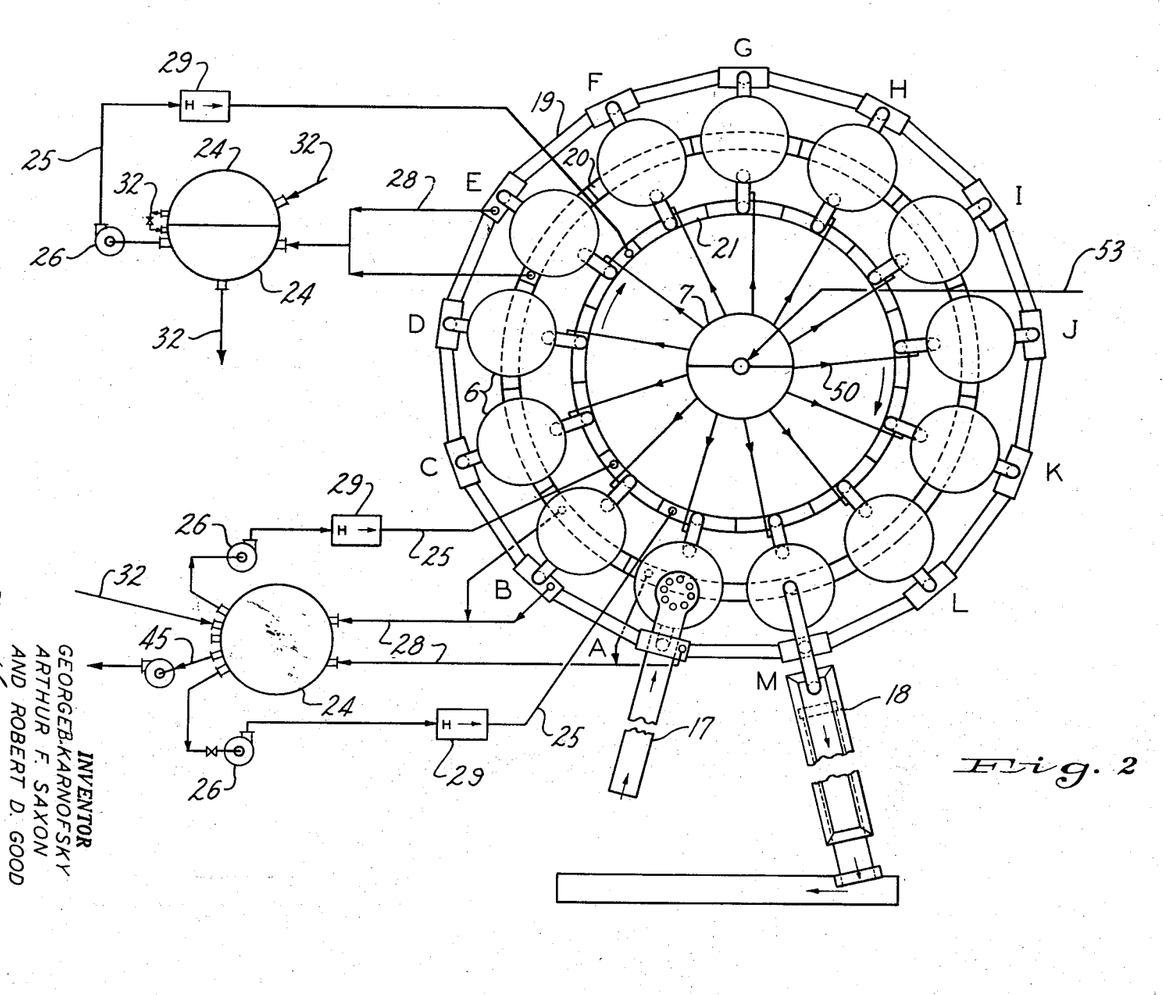
FIG. 2 is a top plan view of a preferred embodiment of the extractor with the top or upper portion thereof cut away along a horizontal line II—II of FIG. 1.

This invention broadly comprises as shown in FIGS. 1 and 2, cells or containers 6 that are suspended from a rotatable vertical shaft 7 by means of radial arms 8 so that the cells 6 can be made to move in a closed horizontal path around the axis of vertical shaft 7, thus defining a rotor 5 turned by a motor means 4 so that cells 6 rotate past circumferential stage positions or stations A through M.

As shown in FIG. 1, the vertical shaft 7 is furnished with upper and lower bearing assemblies 9 and 10. The lower thrust bearing 10 is mounted upon a stationary pedestal 11, the upper bearing 9 is mounted on the underside of a horizontal cross member 12 that is part of a stationary supporting framework having vertical legs 13, the lower ends of which are stationarily fastened to imbedded base portions 13a.

Although FIG. 2 shows a total of thirteen cells 6, as used in one embodiment of the invention, the actual number of cells in any given installation will depend upon the nature and size of the processor's operation. The cells 6 also could be interconnected in the form of a continuous circular tray or trough having spaced apart partitions to define separate cells therein. Also, depending upon the specific nature of the operation, the entire apparatus as shown in FIGS. 1 and 2 could be enclosed within a sealed envelope or housing, such practice being common in the use of conventional extractors that utilize highly volatile solvent as a contacting liquid.

The plurality of cells 6 are constructed to move through a continuous closed path in stage-to-stage progression so that the individual cells of the apparatus may be undergoing separate treatment stages during the same time interval. The cells 6 may be advanced through their horizontal path in incremental steps or the cells 6 may be rotated slowly and continuously through successive treatment stages, but in either case, material solids are fed into successive cells 6 by stationary overhead conveyor means 17 located at the initial treatment stage A.

For one preferred embodiment, thirteen stage locations or points marking treatment positions are indicated on FIG. 2 by letter designations A through M. At the feed stage A, solids material is discharged from conveyor means 17 into cells 6 that are moved into material-receiving position successively in a clockwise direction. When the apparatus is in full operation, a specific cell moving into material-receiving position beneath the discharge end of the conveyor means 17 is preferably first substantially filled with a flow of contacting liquid that is delivered to the cell up through the floor or bottom portion thereof. Thus, solids material discharged from the conveyor means 17 is distributed into liquid already present within the cell and it can be said that stage A serves a dual function; it is a feed or material input stage, and it is also the primary contacting treatment stage at which the solids material is first contacted with a flow of liquid. Once a predetermined quantity of solids material is distributed into the cell at stage A, the solids material is then subjected to a counter-gravitational or upward flow of the contacting solution (the means for accomplishing such flow will be developed at greater length further on in this specification) for a selected time duration after which the cell is drained and then moved in unison with all the other cells 6 on the rotor to the next clockwise stage position. At stages B through L, the solids material carried within a cell is subjected to successive upflow treatments of contacting liquid having successively stronger concentrations of contacting liquid at each new stage encountered by the cell. Although solids material is introduced to the present system at stage A and is progressed through the various treatment stages in a clockwise rotation, the contacting solution is first introduced to the system prior to the last or discharge stage M and is caused to circulate upwardly first through a cell at stage J and is then conducted counterclockwise around the system from stage-to-stage to flow upwardly through successive cells. Thus, solids material first entering the system at stage A is subjected to an upflow of contacting liquid consisting of a substantially high percentage of dissolved extract. As a cell moves clockwise through the stages A through J, the solids material therein is subjected to an upward circulation of liquid at each stage, with each successive stage being characterized by having a flow of liquid with a lesser concentration of extract therein as compared to the preceding stage. Solids material receives an upflow of substantially pure or extract-free contacting liquid at stage J. Stages K and L are used for steam desolventizing following extraction as hereinafter described.

Figures 4, 5, 6:
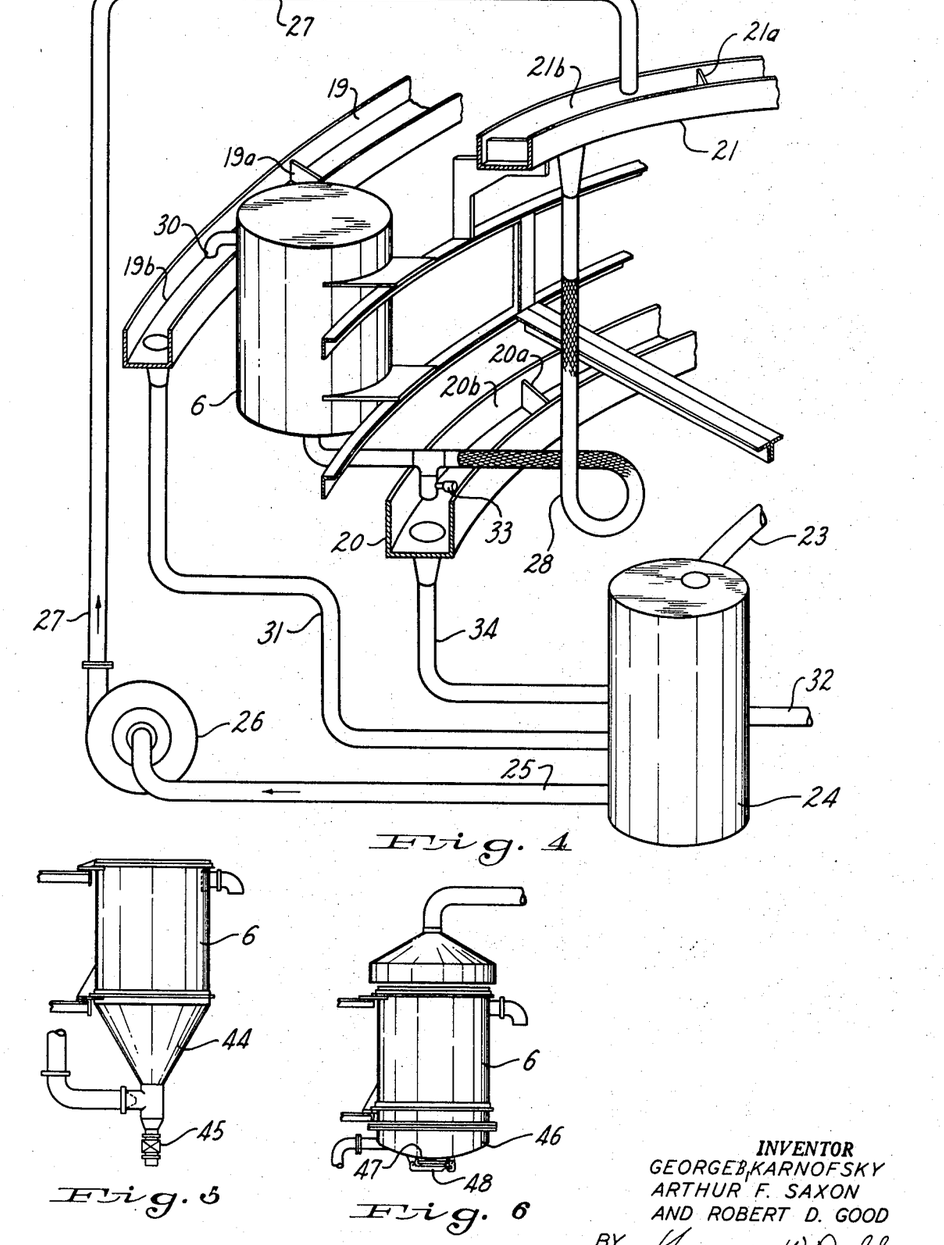
FIG. 4 is a perspective representation of one stage of the apparatus shown with a cell in position and including portions of other pertinent elements of the apparatus.
FIGS. 5 and 6 are respective elevations showing alternative structure for cells in accordance with this invention.

The constituent apparatus of the system that makes possible the flow therethrough of contacting liquid as previously described comprises three circular troughs, each of which is segmented into separate compartments by means of vertical risers (shown clearly in FIGS. 2 and 4). Circular trough 19, which marks the outer perimeter of the apparatus shown in FIG. 2 is a stationary overflow trough divided by means of vertical partitions or risers 19a into separate compartments 19b, with a compartment 19b stationarily positioned at each stage A through M. Trough 20 is a stationary trough positioned beneath the rotating cells 6 of the sysem and is divided into separate stage compartments 20b by means of vertical risers 20a. Trough 21 is a rotatable trough that is carried by the rotor structure to which the cells 6 are mounted and is positioned at a level or horizontal plane above the level of the cells 6 with which it rotates. The trough 21 is divided by means of risers 21a into individual compartments 21b, each of which corresponds to and remains adjacent to a specific cell 6 during operation of the system.

FIG. 4 can be considered to represent any stage in the system. Contacting fluid is introduced through a conduit 23 to a sump tank 24 (a sump tank 24 is positioned at each stage location as shown in FIG. 2). A conduit 25 receives liquid from the tank 24 which is then fed by means of a pump 26 through a conduit 27 which discharges the liquid into a trough 21 which is segmented into compartments 21b by means of risers or dividers 21a. The liquid is funneled out of the trough 21b and down through a conduit 28 which connects to an opening through the bottom of the cell 6. When the cell 6 becomes substantially filled with liquid, the upper level thereof will eventually reach the height of an overflow spout 30 which directs overflow of liquid from the cell 6 into a compartment 19b of stationary trough 19. An opening in the floor of the trough 19 permits liquid therein to flow by gravitational force through a conduit 31 which conducts the liquid back into tank 24. Liquid is thus continuously circulated from the tank 24 and up through the cell 6 and back into the tank 24 for a selected duration of time, the length of which will depend primarily on the nature of the solids material under treatment.

The primary purpose of the stationary trough 20 is to provide a means to completely drain the cell 6 after the upflow circulation of liquid through the cell 6 is completed. In FIG. 4 the conduit 28 is shown having a downwardly extending branch with a valve 33 provided therein that can be opened to allow liquid to drain back from cell 6 and into the trough compartment 20b and thence back to the tank 24 by means of a conduit 34. A separate drain line or conduit may be provided, leading from the bottom of cell 6 and emptying into the trough compartment 20b, if so desired, to allow complete cell drainage.

Once final drainage of a cell 6 is completed at stage M, (FIG. 2) a means such as a conveyor 18 may be provided to remove the solids material from the cell 6 and out of the system. In one preferred embodiment of this invention (FIG. 8), cell 6 is provided with an openable bottom 36 that is hinged along one edge so that it may be opened like a trap door to discharge solids material to an output conveying means 18, after which the bottom is replaced to its closed, sealed position so that the cell 6 may be recharged with solids material at stage A. A double acting hydraulic cylinder 37 may be utilized to open and close the hinged bottom 36 of the cell 6.

Other modifications of the cell 6 are possible, some of which are shown in FIGS. 1, 5 and 6. As shown in FIG. 1, a cell may be furnished with a false bottom of perforate plate on which solids material will rest therein to permit liquid after upflow circulation is completed, to drain away from the solids material and down through perforations in the plate 38 and out of the cell 6 by means of the drain-off conduit 39. A side opening 40 having a hinged removable cover plate 41 is provided to allow solids material to pass from the cell 6, and the perforate plate 38, which may be concave or V-shaped is tilted away from the horizontal in the direction of the side opening 40 so that when the cover plate 41 is caused to open, the material will pass from the cell 6 by gravitational force or be washed out by flushing liquid supplied through pipe 28.

FIG. 5 shows another modification of cell 6 wherein the bottom 44 of the cell 6 is shaped as a funnel, and solids material may be passed therefrom by opening a valve 70 to allow it to pass downwardly to an output conveyor means.

The cell 6 can be again modified as in FIG. 6, to have a rounded bottom 46 with a center opening 47 provided with a hinged cover plate 48 to allow removal of solids material therefrom.

We contemplate further modifications of our invention which, instead of rotating the cells, these may be permitted to remain stationary and the solids feed and discharge means are rotated instead, in accordance with principles well known to the art.

Figure 3:
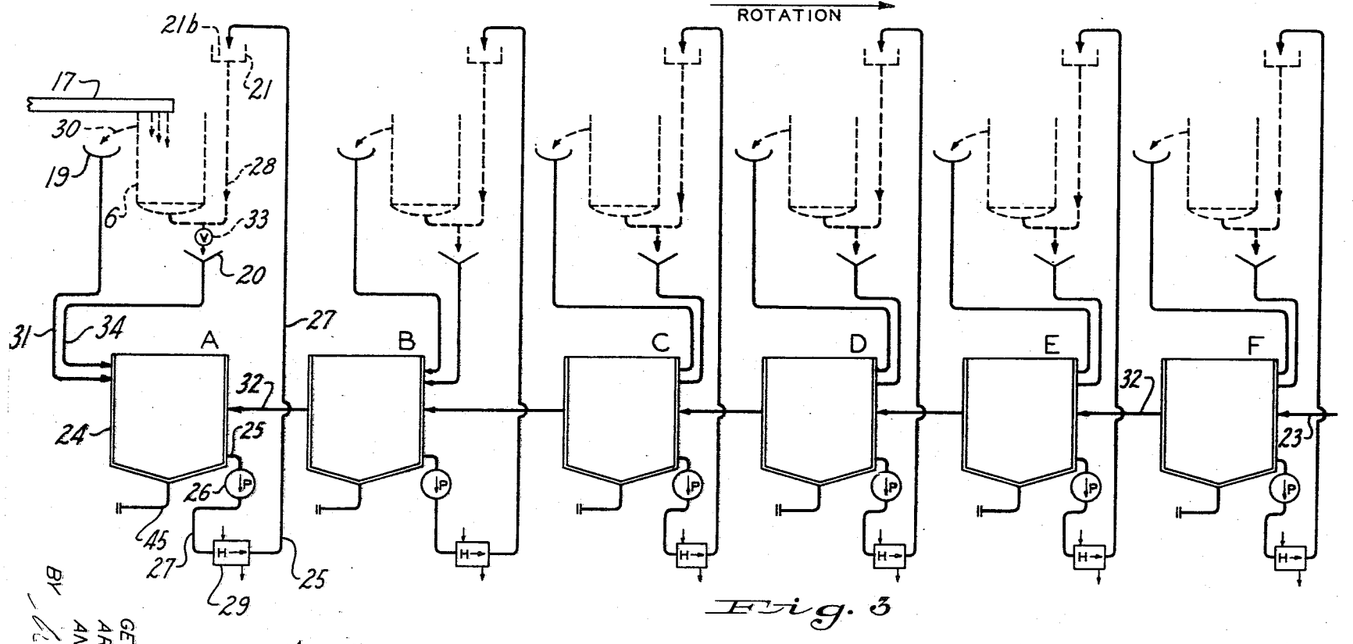
FIG. 3 is a schematic flow diagram representing a preferred embodiment of the invention.

To facilitate comprehension of the operations to which solids material is subjected in the system, and to enable understanding of the solution flow within the system, reference is made to FIG. 3 which is a planar flow diagram representing an embodiment of the present invention having six treatment stages A through F. Sump tanks for adjacent stages though shown repeatedly in FIG. 3, may be constructed with two or more tanks in a unit as shown in FIG. 2, and tanks so unitized may be separated into separate compartments for each stage by means of a vertical partition. Also, depending on the nature of the material being processed, it may be advisable to enclose each tank 24 by the addition of a top cover 24a (FIG. 1) when it is desirable to retain heat in the solvent solution or to prevent vapor dispersal in a plant location.

In a typical operation of the system as shown in FIG. 3, solvent liquid would be introduced near the discharge stage F by conducting it into the stage F sump tank 24 by means of an input pipe 23. When the level of solvent in the sump tank 24 at stage F attains the height of an overflow pipe 32, the solvent is gravity fed into the next sump tank 24 at stage E and thence by overflow to the other successive sump tanks 24 at the other stages in the system, with the sump tank 24 at stage A being the last tank to receive the interstage solvent flow. With solvent thus present in all the tanks 24 of the system shown in FIG. 3, the cell 6 in position at stage A is flooded with solvent from the tank 24 of stage A by actuating the pump 26 which receives solvent by means of pipe 25 from tank 24 and forces it through pipe 27. A heater means 29 is desirable to increase the temperature of the solvent and thus speed up the extraction reaction that takes place in cell 6 when the solvent contacts the solids material. (It is suggested, for full understanding of FIG. 3, that cross reference be made to FIG. 4, which may be considered to represent any stage of the system and where the numerical designations for elements are essentially the same as those in FIG. 3.) The conduit 27 conducts the solvent upwardly and discharges it into compartment 21b of trough 21 which will, when the rotor 5 of the extractor is moved from stage to stage, follow and remain in its adjacent position relative to the cell 6 that it feeds. The solvent in the compartment 21b is gravity fed down through conduit 28, which directs the flow up through the bottom of cell 6. The cell 6 becomes substantially filled with solvent and when the level of solvent therein reaches the height of the overflow pipe 30, solvent flows from pipe 30 through compartment 19a of stationary trough 19. The solvent thus received in compartment 19a from the overflow pipe 30 is directed back to the sump tank 24 of stage A to thus complete the first cycle of the intrastage solvent circulation. Final concentrated solution of extract in solvent is removed through line 45.

Solids material such as wood chips from which resin is to be extracted is now charged into cell 6 by means of conveyor 17 during which time the recirculation of solvent upwardly through the cell, as heretofore described, may be continued. The solvent which in the extraction of wood chips might be a liquid hydrocarbon such as naphtha, flows upwardly into the cell 6 to contact all the surfaces of the wood chips and penetrate therein to dissolve the resin so that the solvent flow moving out through pipe 30 will include extract (in this case—dissolved resin) given up by the wood particles in cell 6.

Recirculation of the solvent upflow through cell 6 is continued for a desired length of time at the end of which the operation of pump 26 is suspended to halt the intrastage recirculation, and a valve 33 is opened to allow solvent solution remaining in the cell 6 to drain therefrom by gravity to a compartment 20a of stationary trough 20. The drain flow from the cell 6 that enters the trough compartment 20a is directed back to the stage A sump tank 24 by means of a conduit 34. With the cell 6 completely drained, valve 33 is returned to its closed position and the cell is rotated to the next successive stage B for further treatment.

The intrastage recirculation of solvent solution is substantially the same at all stages as heretofore described for stage A. While the cell 6 is being subjected to an upflow recirculation at stage B, another cell 6 is in material-receiving position at stage A where the operation described for stage A is repeated.

Still in reference to FIG. 3, the interstage solvent solution flow begins at stage F and progresses from sump tank to sump tank toward stage A. All cells in the system are successively filled with wood chips arranged so that there is a cell positioned at each stage and with all cells successively undergoing intrastage upflow recirculation of solvent at the various stages. The percentage of the solvent making up the liquid solution being circulated through a cell at any given stage will vary inversely with the percentage of residual resin yet to be extracted from the wood chips at each stage. For example, solution being circulated upwardly from the tank 24 at stage F and through a cell under treatment at that stage will consist of a relatively large percentage of solvent and a small percentage of solute in the form of resin dissolved therein, and the wood chips present in the cell under treatment at stage F will have already had the greater percentage of resin extracted therefrom prior to arriving at stage F. At stage A, however, wood chips, with all residual resin intact, are charged to a cell 6 to begin their initial extraction treatment by being contacted with a recirculated upflow of solution that has a comparatively high concentration of resin dissolved therein.

For the purpose of removing residual vaporizable solvent remaining after draining the receptacles, it may be desirable to contact solid material within the cells 6 with steam or an inert gas, while the particles are still in the receptacles, by injecting such steam or inert gas into the cells 6 at latter stages of the system J through L as shown in FIG. 2.

Assuming the desirability of steam injection, means for such injection can be included in the apparatus as shown in FIGS. 1 and 2. In FIG. 1 the vertical axle 7 of the rotor 5 is also a hollow column or steam chamber from which the various structural members supporting the cells 6 are extended. A vertical steam input pipe 53 extends downwardly through a hole in the center of the top horizontal structural member 12 and is connected by a rotatable connecting means 54 which will allow a pipe 55 within the steam chamber to rotate while the pipe 53 remains stationary. The steam conducted into the system by pipe 53 thence through pipe 55 and into the hollow column or steam chamber 7 can be conducted from the chamber by means of radially extended pipes 50 provided with suitable valves 50a to commence and control the flow of steam therethrough.

Whether or not the use of steam or other vapor is desirable in the treatment, a cell hood 51 as shown in FIG. 1 may be required to collect any fumes which may arise from the cell during treatment at any stage in the system or to retain heat within the cell. An annular flexible curtain 52 extended downwardly around the edge of the hood 51 will allow movement of successive cells from hood to hood and to permit the conveyor means 17 to be moved into position beneath the hood 51 to charge solid material into the cells 6 at stage A.

Figures 7, 8:
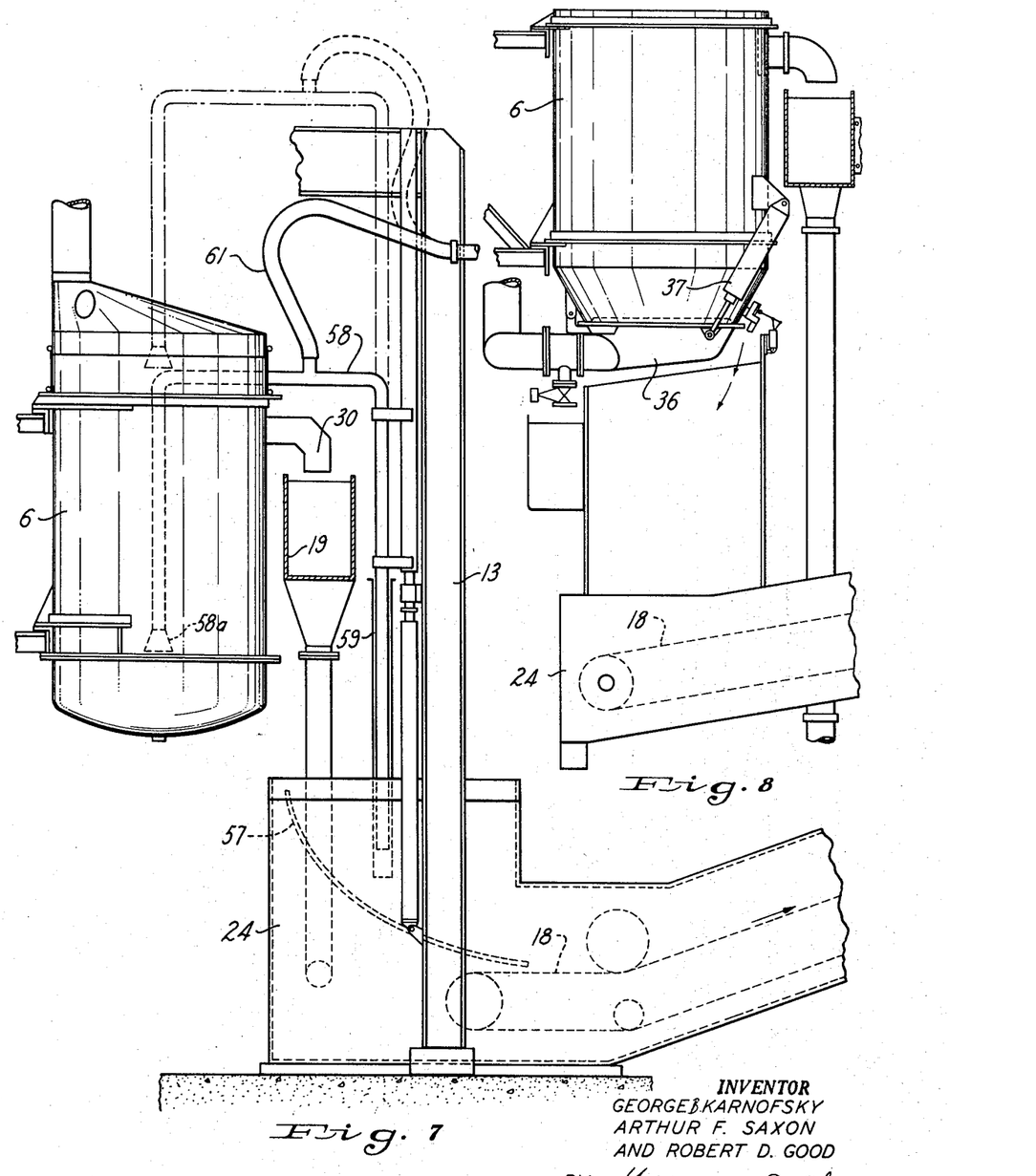
FIG. 7 is a fragmental view of a vertical section of the apparatus in elevation showing primarily an alternate means of discharging treated material from each cell in the system.
FIG. 8 is a vertical section in elevation showing one of several alternate embodiments of cells in accordance with the invention.

A final draining of solvent from the extracted solid material is provided for, in a preferred embodiment of this invention, by allowing the solids material, at the last or discharge stage of the system, to drop from the successive cells 6 directly into the discharge sump tank 24 as shown in FIGS. 1, 7, and 8. The sump tank 24 is thus at this stage open at the top and is positioned to receive material discharged from successive cells 6 as they arrive at the discharge stage of the system. The sump tank 24 at this last stage may be constructed to contain therein a belt-type conveyor means having its receiving end beneath the level of solution in the tank 24. The discharge conveyor 18 may thus comprise an open mesh belt positioned on an incline and having longitudinal retaining edges and lateral cross flights so that it would transport out of the solvent in the tank the solids material deflected onto its surface by means of a diverter plate 57.

Other means can be provided for discharging the cells 6 at the completion of the upflow treatment at each stage. As shown in FIG. 7, a siphon tube 58 can be movably mounted to the stationary vertical member 13 so that its input end 58a can be lowered to the bottom of cell 6. An arrangement can be provided that will enable evacuation of air from the siphon tube 58 to instigate siphon action to effect removal of slurry, made by injecting solvent through the siphon tube, from the cell 6. By means of a flexible hose 61 having one end connected at an intermediate point along the siphon tube, air may be withdrawn from the siphon tube 58 to commence the siphon action, or, alternatively, solvent could be injected into the siphon tube 58 by means of the flexible hose 61 to thus begin discharge of the cell. Another means for discharging the cells would be to mount the cells so that they can be bodily inverted.

The process in accordance with this invention is not limited to the various embodiments heretofore described. The concept is that of subjecting a confined mass of solid material particles to successive upcurrent flows of a liquid derived from an exterior parallel countercurrent solvent flow so that such upcurrent flows are of successively increasing solvent purity. This concept can be accomplished with apparatus which may embody mechanical characteristics not specifically detailed heretofore in this specification. Such a process could be handled with apparatus wherein the confined masses of particles are situated stationarily, with the associated treatment apparatus such as means of solution collection and means of solvent distribution, being moved in relation thereto.

Other apparatus to support the process could include a rotor movable through a non-horizontal plane, with such rotor having material containers connected thereto. On the other hand, stationary containers serviced by various movable means to supply and empty the contacting system of solids material and to supply and withdraw solvent solution could be embodied in an apparatus to effect the process.

Thus various modifications, auxiliary equipment additions, and deletion of parts of the apparatus and system may be made without departing from the spirit of the invention or the scope of the appended claims.

What we claim is:

1. Apparatus for extraction of solid particles by means of a liquid solvent comprising:
   (a) a plurality of receptacles arranged around a common vertical axis;
   (b) means for charging said receptacles successively with solid material to be extracted;
   (c) a plurality of tanks for supplying liquid solvent to said receptacles and for collecting solution removed from said receptacles mounted at spaced intervals about said axis;
   (d) conduit means between said tanks and said receptacles connected to deliver liquid from said tanks into said receptacles near the bottom of said receptacles;
   (e) conduit means from points near the tops of said receptacles to said solvent tanks to deliver solution overflowing from successive receptacles to successive tanks;
   (f) means for discharging said receptacles successively of solid material extracted therein;
   (g) means for relative displacement of said receptacles with respect to said tanks about said axis.

2. Apparatus as described in claim 1 wherein said tanks are interconnected for fluid flow therebetween.

3. Apparatus as described in claim 1 further comprising means to provide a flow of fluid between said tanks successively in the opposite direction from the direction of effective relative motion of said receptacles with respect to said tanks.

4. Apparatus as described in claim 1 further comprising means for causing said tanks to successively communicate with successive receptacles for fluid flow between successive tanks and successive receptacles.

5. Apparatus as described in claim 1 further comprising a siphon means for removing solvent and solids from said receptacles.

6. Apparatus as described in claim 1 wherein said means to supply solvent is connected to said receptacles through an opening in each of said operable closures of said receptacles.

7. A solvent extractor comprising, in combination:
   (a) a plurality of walled containers for extract-bearing particulate solid material capable of movement in a closed path;
   (b) means for supplying said solid material to said containers;
   (c) an openable closure adjacent the bottom of each of said containers;
   (d) a plurality of solvent injection means located at successive stages along said closed path for distributing solvent up through solid material within said containers at a rate sufficient to expand the mass of said material so that particles thereof separate from contact with each other but less than such rate which will entrain and carry away solids from said mass;
   (e) a plurality of compartments to collect solvent removed from said containers at a point near the top thereof during their movement;
   (f) means for withdrawing solvent and extract dissolved therein from at least one of said compartments;
   (g) means for successively opening said closures at a discharge stage for emptying solid material from said containers substantially at the end of a complete cycle of movement around said closed path.

8. Apparatus as described in claim 7 further comprising siphon means for removing solvent and solids from said containers.

9. Apparatus as described in claim 7 wherein each of said plurality of solvent-injection means comprises a tube removably insertable into said container successively, with said tube of a length to permit the output end thereof to extend down through and substantially to the bottom of said material mass.

10. In a continuous system for contacting solid particulate material with a solvent solution, a plurality of containers serially-arranged for treatment in sequential steps at successive treatment stages, each of said containers having an openable closure near the bottom thereof to evacuate material therefrom, means for charging material to be treated into said containers, a plurality of intrastage means for providing a continuous counter-gravitational flow of solvent-container solution generally upwardly through material in each of said containers, interstage means comprising a plurality of tanks serially-arranged and in substantially parallel relation to said serially-arranged containers as to have one of said tanks near each of said stages, with said tanks interconnected in series-communication to provide a continuous flow of solution through said plurality of tanks in a direction counter to the sequence of said treatment steps, and means to provide relative motion between said interstage means and said plurality of containers to establish said successive treatment stages.

References Cited

UNITED STATES PATENTS

| | | | |
|---|---|---|---|
| 3,113,954 | 12/1963 | Upton | 23—269 X |
| 3,131,202 | 4/1964 | Sepmer | 23—269 X |
| 3,302,791 | 2/1967 | Assaline | 23—269 X |
| 3,346,343 | 10/1967 | Wahler | 23—269 |

FOREIGN PATENTS

| | | |
|---|---|---|
| 9,182 | 1890 | Great Britain. |
| 49,176 | 2/1937 | Netherlands. |
| 649,010 | 1/1951 | Great Britain. |
| 928,647 | 6/1963 | Great Britain. |

NORMAN YUDKOFF, Primary Examiner

S. J. EMERY, Assistant Examiner

U.S. Cl. X.R.

23—270, 310, 272.5; 127—5